United States Patent Office 3,515,782
Patented June 2, 1970

---

3,515,782
METHOD FOR CONTROLLING INSECTS
Kenneth Gordon Nolan, Yardley, Pa., assignor to American Cyanamid Company, Stamford, Conn., a corporation of Maine
Filed Nov. 27, 1964, Ser. No. 414,077
Int. Cl. A01n 9/36
U.S. Cl. 424—213                                           5 Claims

ABSTRACT OF THE DISCLOSURE

There is provided a process for protecting an area against insect infestation by applying to said area at a rate from about two to about thirty-two ounces per acre of discrete droplets of undiluted, adjuvant-free malathion.

---

The present invention relates to a novel method for controlling insect pests. More particularly, the invention relates to a method for enhancing the insecticidal activity of O,O-dimethyl phosphorodithioate of diethyl mercaptosuccinate, hereinafter referred to as malathion. Still more particularly, the invention is concerned with methods for controlling insects by the spray application of malathion in substantially undiluted, distinct droplet form.

Malathion has been prepared and described as an effective insecticide in U.S. Letters Patent No. 2,578,652, issued to J. T. Cassaday. Direct application to a locus has been generally avoided due both to the required use of excessively large quantities of malathion and to the phytotoxic effect of the concentrated material. Accordingly, it has been formulated in a variety of ways which are amenable to application with all types of equipment. For instance, malathion has been formulated as a dilute dust or wettable powder. It has also been prepared as an emulsifiable concentrate, as a flowable emulsion or in oil-based formulations as well as in granular, bait and paint compositions. To maximize the control of insect pests, it has been accepted practice to form a thin film on a surface to be protected. For this reason, adjuvants, such as diluents, spreaders, stickers, emulsifiers, penetrants and wetting agents have been incorporated in formulations to obtain extensive coverage on surfaces, such as plant surfaces.

As is known, malathion exhibits relatively short residual activity on plant tissue. Malathion apparently undergoes degradation which appears to be due to the presence of plant enzymes. The latter tend to decarboxylate malathion thereby rendering it ineffective. Further, wetting agents assist in spreading malathion on a plant surface to cause more rapid degradation. If a procedure could be developed wherein malathion could be applied directly to a surface without diluting its insecticidal effect while increasing its residual activity, such would meet a long-felt need in the art.

It is, therefore, an object of the present invention to provide a procedure which avoids the difficulties of the prior practice. It is a further object of the invention to provide a process for applying malathion directly to a locus at a rate as low as two ounces per acre in droplet form whereby desired insect control as well as extended residual activity are attained. These and other objects will become apparent from a consideration of the ensuing description.

2

To this end, it has been surprisingly found that technical malathion which is undiluted and adjuvant free, can be applied to an area to be protected against insects at a rate from about 2 to 32 ounces per acre in the form of finely divided distinct droplets. Successful control of a large variety of insects and enhanced extended residual activity on a plant environment are readily achieved. It is apparent that, in the use of malathion remaining in droplet form without wetting or penetrating an applied surface, there is a substantial reduction in the likelihood of animal contamination and plant phytotoxicity.

According to the process of the invention an area to be protected against insects is sprayed at a rate from about 2 to 32 ounces per acre with distinct droplets of undiluted, adjuvant free malathion. Although rates as high as 32 ounces per acre can be applied without adversely affecting treated surfaces, such as plant surfaces, effective control of many insects is achieved by applying from about 2 to about 16 ounces per acre and, preferably, from 4 to 12 ounces per acre thereto.

In general, droplets of malathion should possess a mass median diameter ranging from about 25 microns to about 150 microns. If the mass median diameter of the droplets is less than about 25 microns, the droplets are subject to excessive loss through wind drift. Where the mass median diameter of the droplets exceeds about 150 microns, it is difficult, if not impossible, to obtain satisfactory distribution and complete coverage of an area necessary for effective insect control. Thus, for optimum results including extended residual activity, there is provided a fine spray which produces droplets having a mass median diameter between about 25 microns and about 150 microns. This is achieved by employing a variety of nozzle types, such as for instance, flat fan nozzles in conventional spray equipment.

To facilitate a further understanding of the present invention the following illustrative examples are presented. These are not to be taken as limitative of the invention.

EXAMPLE 1

This example illustrates the procedure for controlling grasshoppers employing malathion at various low levels.

Effective control of grasshoppers infesting large areas of range land is demonstrated by the following tests wherein graded levels of undiluted, adjuvant free malathion were distributed over grasshopper infested areas by aerial application as finely divided droplets having a mass median diameter in the range of from about 30 to 80 microns. Prior to treatment, individual plots were inspected and grasshopper infestations per square yard determined. A small plane, provided with standard spray equipment and provided with several nozzles adapted to disperse the malathion as finely divided droplets of the indicated mass median diameter. Air and ground temperature and relative humidity in the area of the plots was determined prior to application. Flying at elevations at approximately 35 feet above ground level, predetermined rates of the undiluted, adjuvant free malathion were deposited on the test plots. Swath widths of 75, 150 and 225 feet were used to determine practical limits. At intervals of 3 and 7 days after treatment, the various plots were again examined and grasshopper infestation per square yard of treated area determined and recorded. The results of these tests are tabularized in Table I below.

TABLE I

| Swath Width (ft.) | Plot No. | Actual Dosage (Oz./acre) | Temperature (° F.) | | Relative Humidity (Percent) | Wind (m.p.h.) | Grasshoppers/Sq. Yd. | | | Percent Kill After— | |
|---|---|---|---|---|---|---|---|---|---|---|---|
| | | | Air | Ground | | | Before Treatment | After— 3 Days | After— 7 Days | 3 Days | 7 Days |
| 75 | 1 | 9.20 | 55 | 52 | 55 | 0–2 | 11.2 | 1.2 | 0.8 | 89.5 | 92.7 |
| | 5 | 8.00 | 82 | 102 | 25 | 8–15 | 12.6 | 0.3 | 0.5 | 97.9 | 95.7 |
| | 11 | 12.00 | 53 | 52 | 36 | 4–5 | 27.9 | 0.4 | 0.0 | 98.7 | 100.0 |
| | 20 | 11.75 | 61 | 60 | 54 | 5–8 | 25.3 | 0.5 | 0.2 | 98.2 | 99.3 |
| | 9 | 6.70 | 74 | 73 | 43 | 5–8 | 26.6 | 0.5 | 0.2 | 98.0 | 99.3 |
| 150 | 2 | 8.00 | 55 | 52 | 55 | 0–1 | 20.1 | 0.9 | 0.9 | 95.5 | 95.5 |
| | 6 | 8.00 | 84 | 102 | 24 | 6–15 | 25.0 | 2.7 | 0.9 | 89.2 | 96.4 |
| | 16 | 8.00 | 53 | 52 | 64 | 3–6 | 34.9 | 0.1 | 0.2 | 99.7 | 99.5 |
| | 19 | 11.75 | 64 | 60 | 22 | 4–9 | 27.5 | 0.5 | 0.2 | 98.4 | 99.3 |
| | 12 | 6.70 | 74 | 73 | 43 | 7–12 | 33.4 | 0.6 | 0.2 | 98.1 | 99.5 |
| 225 | 3 | 8.00 | 56 | 52 | 53 | 0–1 | 26.6 | 1.7 | 1.7 | 93.6 | 93.6 |
| | 7 | 8.00 | 85 | 102 | 20 | 8–12 | 25.4 | 2.3 | 0.5 | 91.1 | 98.2 |
| | 13 | 8.00 | 53 | 50 | 64 | 1–5 | 31.9 | 0.5 | 0.5 | 98.3 | 98.6 |
| | 18 | 11.75 | 65 | 64 | 48 | 7–13 | 24.2 | 0.9 | 0.5 | 96.3 | 97.8 |
| | 14 | 6.70 | 79 | 79 | 31 | 8–12 | 23.9 | 0.5 | 0.3 | 97.7 | 98.9 |

From the data presented in the table above ranges from 6.7 to 12 ounces per acre of undiluted, adjuvant free malathion result in kills between 89.5% and 100%.

EXAMPLE 2

This example illustrates the control of cereal leaf beetles.

In this test some 26,000 acres were treated with undiluted, adjuvant free malathion applied from the air at the rate of approximately 8 ounces per acre. Prior to treatment, adult cereal leaf beetle counts were made. The planes used for treatment were equipped with standard aerial spraying equipment having flat fan nozzles adapted to disperse the malathion as finely divided droplets of mass median diameter between about 30 and 80 microns. The malathion spray was applied from an elevation of about 35 feet above ground level and at swath widths of approximately 150 feet. Six to eight hours after treatment, the area was inspected and mortality rate of adult cereal leaf beetle estimated at approximately 40% to 50%. Twenty-four hours after treatment the area was again examined and substantially complete kill of adult cereal leaf beetles noted. In addition, substantial kills of ground beetles, lady beetles, wasps, flies and ants were observed.

EXAMPLE 3

The procedure of Example 2 was repeated in every detail except that 16 ounces of malathion in one gallon of water was applied in lieu of the undiluted, adjuvant free malathion. Even at twice the concentration of malathion, no kill and, therefore, no control of the cereal leaf beetles were observed.

In this example, the 16 ounces of malathion (diluted in water) was in the form of a 57% emulsifiable concentrate.

EXAMPLE 4

This example illustrates the control of mosquitoes in salt marshes.

Mosquito control with undiluted, adjuvant free malathion was obtained at rates of approximately 2.6 to 4.5 ounces per acre. However, prior to treatment, infestation of the area was determined by persons who entered the marshes and recorded the number of bites per minute they received. Average bites per minute amounted to 75. The marshes were then sprayed from the air, at an elevation of 125 feet above ground level, with the undiluted, adjuvant free malathion at the rates heretofore indicated. Mass median diameter of the malathion droplets was measured between 25 and 100 microns. Twelve hours after treatment the area was again entered and the number of mosquito bites received determined. At this time it was found possible to remain in one area for as long as seven minutes before a single mosquito bite was received. Control of mosquitos in the area had thereby been achieved.

EXAMPLE 5

Control of cotton boll weevils is attained in the following manner:

Undiluted, adjuvant free malathion is applied to infested areas of nearly mature cotton by spraying from the air with the undiluted, adjuvant free malathion in the form of finely divided droplets at several different rates of application. To determine effective control, O,O-dimethyl O-p-nitrophenyl phosphorodithioate (i.e., methyl parathion) and O,O-dimethyl s-[4-oxo-1,2,3-benzotriazin-3(4H)-yl methyl] phosphorodithioate (i.e., Guthion) were employed as standards at rates known to be effective in controlling the cotton boll weevil. These products were applied as emulsifiable concentrates in 3 gallons of water in accordance with conventional practice.

Prior to the application of either malathion or the controls, the test plots were examined and the percentage of weevil infested squares determined and recorded. Thereafter, the plots were sprayed at elevations of 35 feet for malathion and at crop level, usually from 8 to 10 feet, for the emulsifiable concentrates which were employed as the standards. Subsequent treatments were applied on a 4 to 5 day schedule and counts were made generally four days after treatment. Spraying of the emulsifiable concentrates in water at crop level is necessitated by the fact that water emulsions readily evaporate and result in ineffective application of the insecticide. It has been observed that this is the situation regardless of the particular insecticide employed. It has been further observed that no wetting or penetrating of the foilage occurs employing undiluted, adjuvant free malathion.

The results of the comparative tests are collated in Table II below.

TABLE II

| Insecticide, Actual/Acre | Treatments Formulation | Total Acres Treated | No. of Fields | Percent Infested Squares | | | | |
|---|---|---|---|---|---|---|---|---|
| | | | | Pre-treatment | Days After Treatment 4 | 4 | 3 | 2 |
| Malathion [1] (9 fl. oz.) | Technical | 46 | 4 | 34 | 24 | 17 | 18 | 12 |
| Malathion [1] (14 fl. oz.) | do | 56 | 2 | 27 | 10 | 15 | 15 | 7 |
| Malathion [1] (18 fl. oz.) | do | 50 | 5 | 44 | 26 | 18 | 15 | 8 |
| Methyl Parathion [2] (8 oz.) | E.C.[2] | 32 | 4 | 27 | 19 | 16 | 11 | 16 |
| Guthion [2] (4 oz.) | E.C.[2] | 22 | 3 | 39 | 24 | 19 | 20 | 14 |

[1] All malathion treatments applied as technical material.
[2] Applied in 3 gallons of water as an emulsifiable concentrate (E.C.).

EXAMPLE 6

The control of western corn rootworm is illustrated in this example following the procedure employed in Example 1.

Corn fields were sprayed with undiluted, adjuvant free malathion through conventional aerial spray equipment provided with flat fan nozzles to provide droplets having mass median diameters between 25 and 150 microns. Application of the malathion was made from an elevation of about 30 to 50 feet and at swath widths amounting to about 150 feet. Prior to application random individual corn stalks throughout the test area were examined and found to be infested with an average of about 25 corn rootworm beetles per stalk. The malathion was applied at from 3 to 5.5 fluid ounces per acre and 24 hours after application the corn was examined for corn rootworm infestation. It was observed that 95% to 100% kill had been obtained.

EXAMPLE 7

In this example horn flies and face flies on pastured cattle are controlled in the following manner:

Adjuvant free malathion was sprayed from an airplane over pasture lands in which 60 head of cattle and 13 calves were grazing. The malathion was applied as finely divided droplets of undiluted, adjuvant free material at the rate of 8 ounces per acre at an elevation of between 25 and 35 feet and at 75-foot swath widths. Prior to treatment it was determined that approximately 250 horn flies and 7 face flies per animal were present. From 2 to 55 hours after application of the malathion to the pasture and animals, complete control of both horn flies and face flies was achieved. Seven days after treatment only 5 to 25 horn flies were in evidence.

EXAMPLE 8

Control of green cloverworm in field beans is illustrated by the following test wherein 9 fluid ounces of undiluted, adjuvant free malathion was applied as finely divided droplets from an airplane flying at an elevation of approximately 35 feet. Four days after application the treated areas and adjacent untreated areas were examined for green cloverworm infestation. The treated areas were found to average 8.8 worms per sweep of a net while the untreated areas averaged 37.7 worms.

EXAMPLE 9

Enhanced activity and extended residual life of malathion is illustrated by the following laboratory tests wherein substantially undiluted malathion is found to be markedly superior to conventional formulations of malathion.

Undiluted malathion was compared with emulsifiable concentrates at graded levels. In these tests healthy Sieva lima bean plants were sprayed with the undiluted product having a mass median diameter between 25 and 150 microns and either malathion as a 57% emulsifiable concentrate diluted with sufficient water to obtain 4.75% malathion, or technical malathion diluted with either an aromatic solvent or triethyl phosphate to obtain 6% malathion, was applied at sufficient levels to produce 2.5, 5.0 or 10 milligrams of actual malathion per square foot. The sprayed plants were then placed in constant temperature and humidity chambers and maintained for 16 days. Sample leaves were taken at various intervals and placed in Petri dishes with 10 third instar southern armyworm larvae. The Petri dishes were then placed on a bench in a controlled temperature and humidity room and examined 48 hours later. It was noted that leaves placed in the Petri dishes with the armyworm larvae 2 days after treatment with the emulsifiable concentrate were ravaged, for instance, by the larvae, but the leaves treated with the undiluted, adjuvant free malathion were not damaged. Leaves taken on the fourth day after treatment and placed in Petri dishes with third instar southern armyworm larvae produced even more dramatic results. Such results appear in the accompanying drawing and in Table III below. It can be seen that, from the drawing, no control was achieved with the emulsifiable concentrate at 2.5, 5.0 or 10 milligrams per square foot of malathion, whereas substantially complete control was achieved with the undiluted malathion at even the lowest rate, 2.5 milligrams per square foot.

TABLE III.—LABORATORY TEST SHOWING RESIDUAL CONTROL OF SOUTHERN ARMYWORM WITH TECHNICAL AND FORMULATED MALATHION

| Formulation | Rate of Actual Malathion (mg./sq. ft.) | Percent Control after Treatment | | | |
|---|---|---|---|---|---|
| | | 2 days | 4 days | 8 days | 16 days |
| Malathion, technical | 2½ | 94 | 99 | 74 | 55 |
| | 5 | 98 | 98 | 87 | 60 |
| | 10 | 100 | 100 | 95 | |
| Malathion, 57% C., diluted to 4¾% malathion with water | 2½ | 15 | 0 | 0 | |
| | 5 | 63 | 0 | 0 | |
| | 10 | 73 | 0 | 0 | |
| Malathion, technical, diluted to 6% malathion with Panasol AN-2K (aromatic solvent) | 2½ | 0 | 0 | 0 | |
| | 5 | 0 | 0 | 0 | |
| Malathion, technical diluted to 6% malathion with triethyl phosphate | 4 | 35 | 0 | 0 | |
| | 10 | 93 | 33 | 0 | |

It can be seen from the data presented above that the malathion emulsifiable diluted with water and the technical malathion diluted with the aromatic solvent and triethyl phosphate are markedly inferior to the undiluted technical malathion.

EXAMPLE 10

Extended residual activity of the undiluted, adjuvant free malathion is established by the following tests wherein a composition containing 40 ounces of malathion (actual) applied as a 57% emulsifiable concentrate in 3 gallons of water was compared with a composition containing 9 ounces of undiluted, adjuvant free malathion applied as such. In the tests a small airplane applied the test materials to substantially mature cotton fields from an elevation of approximately 35 feet. Following application leaves from cotton plants in each of the fields were collected, taken to the laboratory, and daily analyzed for the presence of malathion. When it was determined that only 12½ parts per million of malathion remained on the leaves, analysis was terminated. The results of the analyses are tabulated below and from these it can be seen that the malathion applied as an emulsifiable concentrate degraded to about 12½ p.p.m. in 4 days, whereas the undiluted, adjuvant free malathion degraded to essentially the same level in about 9 days.

TABLE IV

| 40 oz. malathion actual applied as 57% E.C. in 3 gals. of water | | 9 ounces undiluted, adjuvant free malathion | |
|---|---|---|---|
| | Hours | | Hours |
| Parts per million: | | Parts per million: | |
| 190 | 0 | 220 | 0 |
| 96 | 24 | 140 | 28 |
| 38 | 48 | 120 | 56 |
| 16 | 96 | 69 | 109 |
| | | 12.5 (approx.) | 220 |

Advantageously, there is a substantial saving to be had in applying undiluted, adjuvant free malathion under most conditions existing in the field. Marked savings result from the elimination of solvents, carriers and other diluents as well as in avoiding cost attributable to mixing, transportation, and storage. A comparison between the application of undiluted adjuvant free malathion and the conventional application of malathion at rates which will produce equivalent insect control is succinctly summarized in Table V below.

TABLE V

[Low Volume Concentrate Vs. Conventional Aerial Spray to treat 1,200 acres (i.e., 0.5 mile in width and 3.75 miles in length)]

|  | Undiluted, Adjuvant Free Malathion | Conventional Application of Malathion |
|---|---|---|
| Application rate/acre, fl. oz | 8 | [1] 12.5-20.4 |
| Effective swath, feet | 100 | 35 |
| Speed, m.p.h | 100 | 100 |
| Load carried per trip, gallons | 75 | 135 |
| Total Time Required For Treatment (in minutes) | 166 | 666 |
| Ferrying Time: 6 miles round trip (in minutes) | 4 | 97 |
| Spraying and Turning time (in minutes) | 159 | 453 |
| Loading Time (in minutes) | 3 | 116 |
| Ferry distance, round trip, miles | 6 | 6 |
| Trips required | 1 | 27 |
| Acres treated per load | 1,200 | 45 |
| Acres treated per hour | 432 | 108 |

[1] Malathion in 3 gallons of water.

From the data presented above, it is critical in the practice of the invention to utilize distinct droplets of malathion which remain as such on an applied surface without wetting or penetrating the same. As described herein, malathion is employed substantially in its undiluted, adjuvant free form. Of course, any grade of malathion can be employed and tolerated herein, provided that impurities including foreign elements of whatever nature which may be present, do not reduce the surface tension or increase the wetting properties of the applied malathion as applied and contemplated.

I claim:
1. A method for controlling insects which comprises spraying an area subject to insect infestation with discrete droplets having a mass median diameter between 25 and 150 microns of an insecticidally effective amount of malathion in its undiluted, adjuvant free form.

2. A method according to claim 1 wherein the malathion is applied to said area at a rate of from about 2 ounces to about 16 ounces per acre.

3. A method for controlling insects which comprises spraying a surface area subject to insect infestation with an insecticidally effective amount of discrete droplets having a mass median diameter between 25 and 150 microns of undiluted, adjuvant free malathion whereby said malathion remains as droplets without wetting or penetrating the surface area.

4. A method according to claim 3 wherein the said malathion is applied at the rate of from about 2 ounces to about 16 ounces per acre.

5. In a method for increasing residual activity of malathion and controlling insect infestation, the improvement which comprises: spraying a plant subject to insect infestation with discrete droplets of an insecticidally effective amount of malathion in its undiluted, adjuvant free form, wherein said droplets of malathion possess a mass median diameter between 25 and 150 microns.

References Cited

UNITED STATES PATENTS 2,578,652  12/1951  Cassaday _____ 167—22 XR
2,890,236  6/1959   Sehring et al. ____ 167—22 XR
2,915,429  12/1959  Scherer et al. _____ 167—22

OTHER REFERENCES

Pest Control, November 1950, p. 13.
Potts Concentrated Spray Equipment, 1958, pp. 277, 311–315, and 327.

ALBERT T. MEYERS, Primary Examiner

D. R. ORE, Assistant Examiner